J. SAMPSON.
Machines for Pulling Cotton-Stalks.
No. 151,800. Patented June 9, 1874.
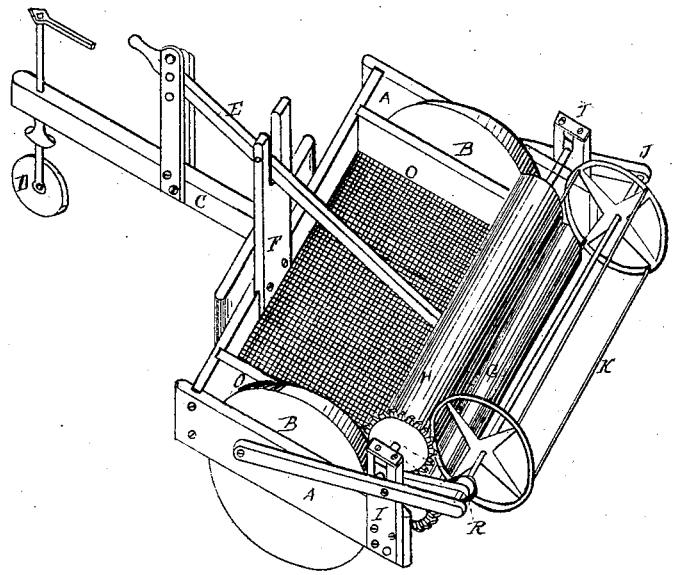
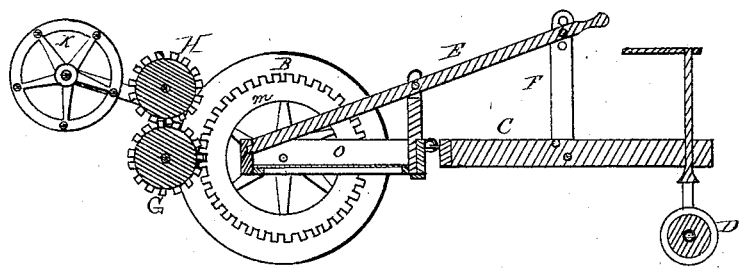
WITNESSES:
Hill H. Morrow
A. Moore
INVENTOR
James Sampson
by A. H. & R. K. Evans
Attys

UNITED STATES PATENT OFFICE.

JAMES SAMPSON, OF SAN FRANCISCO, CALIFORNIA.

IMPROVEMENT IN MACHINES FOR PULLING COTTON-STALKS.

Specification forming part of Letters Patent No. 151,800, dated June 9, 1874; application filed March 16, 1874.

*To all whom it may concern:*

Be it known that I, JAMES SAMPSON, of San Francisco city and county, State of California, have invented a Machine for Pulling Cotton-Stalks; and I do hereby declare the following description and accompanying drawings are sufficient to enable any person skilled in the art or science to which it most nearly appertains to make and use my said invention without further invention or experiment.

My invention relates to a machine for pulling up old cotton plants or stalks in the fall of the year after the cotton has been picked, and when it is desired to remove them from the ground and field, so that they will not interfere with the plowing and subsequent cultivation of the land.

In order to fully explain my invention, reference is had to the accompanying drawings, forming a part of this specification, in which—

Figure 1 is a perspective view of my machine. Fig. 2 is a longitudinal section in elevation.

A is a frame, which is mounted and balanced upon the bearing-wheels B B. The pole or tongue C is hinged at one end to the rear of the frame A, while its opposite end is supported by a guiding or steering wheel, D. The machine is moved by horses, which are hitched to the pole C with their heads toward the machine, so that they push the machine along in front of them. E is a lever, which has one end secured to the forward part of the frame A, midway between the bearing-wheels, and which extends back to about the middle of the tongue C, and has its fulcrum in the upper end of a standard, F, on the rear part of the frame, so that the driver can, by means of this lever, raise or lower the forward part of the frame, as required by the varying heights of the cotton or other stalks to be pulled. Mounted at the front end of the frame A are two rollers, G H, one above the other, and bearing in upright standards I, which are secured to the front of the frame.

These rollers are long enough to extend the entire width of the frame, and the upper roller is made yielding by means of spring-boxes, which permit it to give in an upward direction, in order to allow the stalks to pass through between them.

In practice these rollers will be either corrugated or provided with short teeth, which mesh or engage with one another, so as to give a good hold upon the stalks.

To each side of the frame A I secure one end of a bar, J, which extends to the rear of the machine and beyond the rollers at the desired angle, being also supported by the standards I, and in the outer ends of these bars the shaft which supports the reel K is supported. This reel is driven by a belt-connection, $r$, with an outside pulley on the shaft of one of the driving-wheels, while the rollers G H are driven by an inside toothed wheel, $m$. The reel is supported at the proper height to catch the tops of the bushes or stalks, and force them toward and between the rollers G H. The rollers immediately clasp and pull the stalks up by the roots, and carry them through between them to the opposite side, where they are dropped into a box, O, which is constructed inside of the frame A, and which has a wire-cloth or other suitable bottom, as shown.

As often as desired the pulled stalks are removed from the box O, and deposited in piles, to be bound or otherwise dealt with, as desired.

Having thus described my invention, what I claim, and desire to secure by Letters Patent, is—

The frame A, with its box or receptacle O, and having the hinged pole C, with its steering-wheel D, and the operating-lever E, in combination with rollers G H and reel K, all combined and arranged to operate substantially as and for the purpose described.

In witness whereof I hereunto set my hand and seal.

JAMES SAMPSON. [L. S.]

Witnesses:
 GEO. H. STRONG,
 C. M. RICHARDSON.